United States Patent [19]

Schellmann et al.

[11] Patent Number: 4,747,340
[45] Date of Patent: May 31, 1988

[54] PISTON FOR INTERNAL COMBUSTION ENGINES

[75] Inventors: Klaus Schellmann, Weinsberg; Siegfried Mielke, Neckarsulm; Ulrich Landau, Oedheim, all of Fed. Rep. of Germany

[73] Assignee: Kolbenschmidt Aktiengesellschaft, Neckarsulm, Fed. Rep. of Germany

[21] Appl. No.: 837,455

[22] Filed: Mar. 7, 1986

[30] Foreign Application Priority Data

Mar. 14, 1985 [DE] Fed. Rep. of Germany ....... 3509103

[51] Int. Cl.⁴ ............................................. F16J 1/16
[52] U.S. Cl. ........................................ 92/222; 92/172
[58] Field of Search ................ 92/216, 220, 187, 188, 92/189, 190, 191, 222, 172; 123/193 P

[56] References Cited

U.S. PATENT DOCUMENTS

| | | | |
|---|---|---|---|
| 1,433,987 | 10/1922 | Deibert | 92/189 |
| 1,521,515 | 12/1924 | Erskine | 92/220 X |
| 1,537,665 | 5/1925 | Frue | 92/220 X |
| 2,823,085 | 2/1958 | Keylwert | 92/187 X |
| 2,926,975 | 3/1960 | Karde et al. | 92/222 X |
| 3,789,743 | 2/1974 | Sihon | 92/187 |

Primary Examiner—Edward K. Look
Attorney, Agent, or Firm—Sprung Horn Kramer & Woods

[57] ABSTRACT

In a piston comprising a top part, which includes at least the piston head and the ring-carrying portion, and a bottom part, which is connected to the top part by suitable means, the adequate lubrication of the piston pin, which is firmly connected to the connecting rod is ensured in that the piston pin is movably mounted in hub segments, which are connected to the bottom part, and in a recess which has the shape of a segment of a cylinder and is formed in a plate that is made of heat-insulating material and inserted on the inside surface of the piston head.

24 Claims, 2 Drawing Sheets

PISTON FOR INTERNAL COMBUSTION ENGINES

BACKGROUND OF THE INVENTION

This invention relates to a piston, particularly for internal combustion engines, which piston comprises a top part including at least a piston head and a ring-carrying portion, and also comprises a bottom part, which is connected to the top part by suitable means.

The fuel consumption of modern internal combustion engines can be decreased by a reduction of the weight of components of said engines and a contribution to the saving of energy can thus be made. Internal combustion engines are thus required to be as light in weight as possible and should also meet high comfort requirements as regards the production of noise and vibrations. Said targets of development can be reached in part by the use of pistons which are light in weight so that they have small oscillating masses. For this reason persons skilled in the art face the problem of designing lightweight pistons which are suitable for use in modern internal combustion engines, but where a reduction in weight does not reduce the reliability in operation and the life of the pistion.

Pistons intended for use, inter alia, in internal combustion engines have been designed for a saving in weight and a reduction of friction losses in that the skirt has been provided with recesses adjacent to the horizontal plane containing the piston pins and in that the hubs of the piston pin bosses have been arranged as close as possible to the center of the piston. The distance between the outer ends of the hubs of the piston pin bosses is only 60 to 75% of the diameter of the piston so that a very short piston pin can be used, which has an overall length of up to 60% of the diameter of the piston. The lower portion of the skirt of the piston is usually circular, although the recesses may alternatively extend as far as to the lower end of the skirt so that the circular skirt portions below the piston pin are entirely eliminated.

It is also desirable to minimize the distance between the axis of the piston pin and the top of the piston head, i.e., the compression height. This will not only result in a lighter weight and in lower friction losses, but will also permit a reduction of the overall height of the crankcase. For this purpose it is known from Published German Application No. 32 35 220 to provide, for internal combustion engines, a piston which comprises an outer piston and the piston skirt, and an inner, second piston part, which carries the hubs of the piston pin bosses. To permit the use of long connecting rods and in order to reduce the tilting moments generated by the mass forces of the piston, the second part of the piston is firmly connected to the first part of the piston and the axis of the piston pin extends substantially through the center of gravity of the entire piston approximately on the level of the ring-carrying portion. Such a piston has the decisive disadvantage that the inner part of the piston, including the hubs of the piston pin bosses, is directly secured to the piston head so that the piston pin is strongly heated by the piston head, which is at a high temperature of up to 280° C. As a result, an adequate lubrication cannot be ensured because the lubricant is coked; this results in a heavy wear of the piston pin and of the hubs of the piston pin bosses.

SUMMARY OF THE INVENTION

It is an object of the present invention to design the piston described first hereinbefore for use in internal combustion engines so that the piston pin is heated during the operation of the engine to a temperature which is within permissible limits so that an adequate lubrication of the piston pin is ensured.

This object is accomplished in that the piston pin, which is firmly connected to the connecting rod, is movably mounted in hub segments of the bottom part of the piston and in a recess, which has the shape of a segment of a cylinder having an axis that is parallel to the piston pin, which recess is formed in a plate that is inserted in a mating recess on the inside of the piston head and consists of a heat-insulating material.

That plate preferably consists of a ceramic material, a metallic material which is coated with a ceramic layer, or a molding composed of ceramic fibers.

In a preferred embodiment of the invention the top and bottom parts of the piston are connected by means of at least two screws or pins, which are integrally formed with or embedded in the cast bottom part or inserted in the bottom part and protrude into mating bores of the top part and are firmly screw-connected or welded to the piston head.

In a still further preferred embodiment of the piston the distance between the outer ends of the hub segments of the bottom part is smaller than the inside diameter of the top part. In accordance with a further feature, the circular lower end portion of the skirt of the piston serves to guide the piston in the cylinder and the skirt has set back portions which are defined by chords and extend in part laterally of the hub segments and in part below the same as far as to the circular end portion of the bottom part.

To achieve an optimum saving of weight, the compression height amounts to 20 to 30% of diameter of the piston, the distance between the hubs of the piston pin bosses amounts to 80 to 65% and the length of the piston pin amounts to 50 to 70% of said diameter.

A special feature of the invention resides in that that side which faces the piston head the plate is formed with grooves, which extend transversely to the direction of the piston and which are intended to cause a controlled fracture of the ceramic plate when a non-uniform load is applied, which is due to asymmetry or to a dislocation of forces. Owing to the size of the fragments of the plate and to the position of the piston pin said fragments cannot fall out so that the heat insulation and the lubrication of the piston pin will be entirely maintained.

The advantages afforded by the invention reside particularly in that the temperature loading of the piston pin is not higher than in conventional pistons so that there is no danger of a coking of lubricant and the formation of an adequate film of lubricant between the sliding surfaces of the hub segments and the piston pin is ensured.

The invention is shown by way of example in the drawings and will now be explained more in detail.

DETAILED DESCRIPTION OF THE INVENTION

Figure 1:
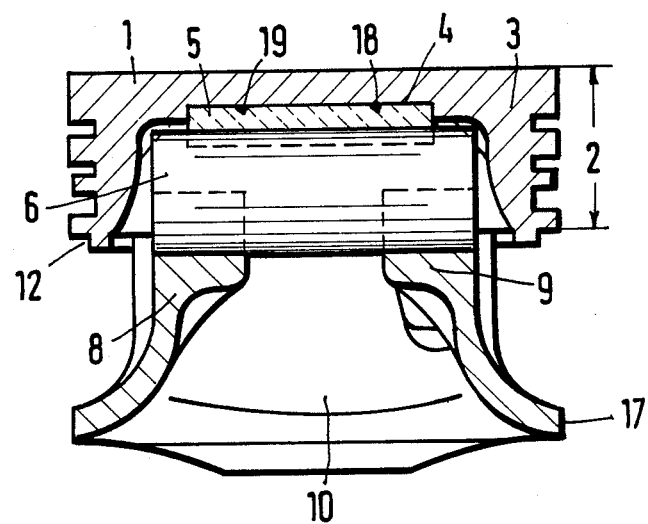
FIG. 1 shows a light alloy piston according to the invention, in a longitudinal sectional view taken on the plane which contains the piston pin axis and the piston axis.
Figure 2:
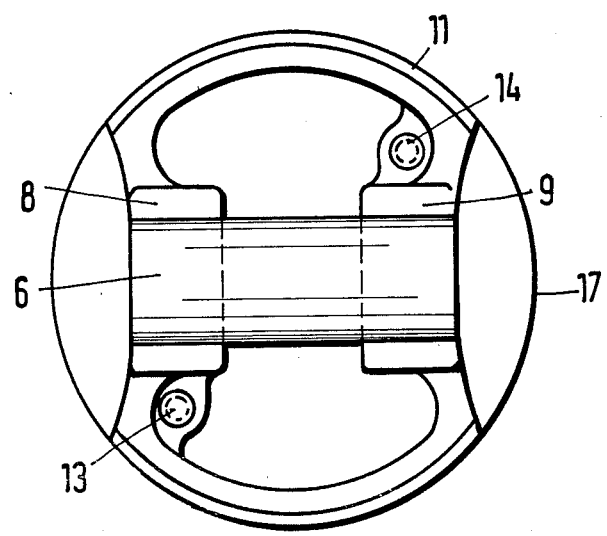
FIG. 2 is a top plan view showing the lower part of the light alloy piston of FIG. 1 with the piston pin inserted therein.
Figure 3:
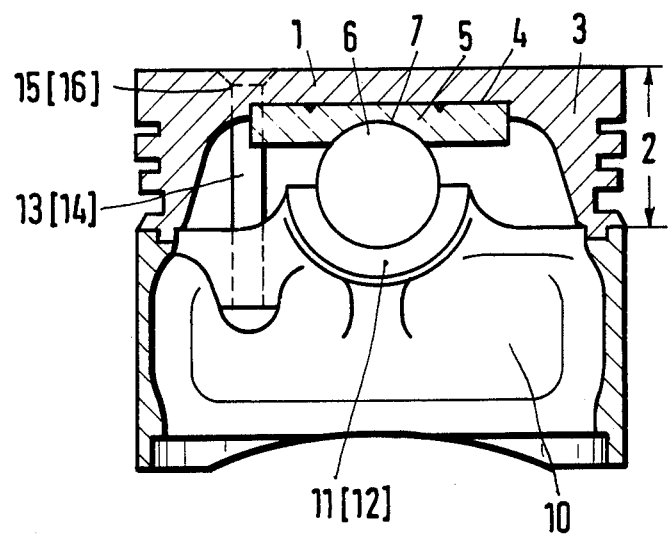
FIG. 3 is a longitudinal sectional view of the FIG. 1 piston taken on the plane which contains the piston axis and the direction that is at right angles to the piston pin axis.
Figure 4:
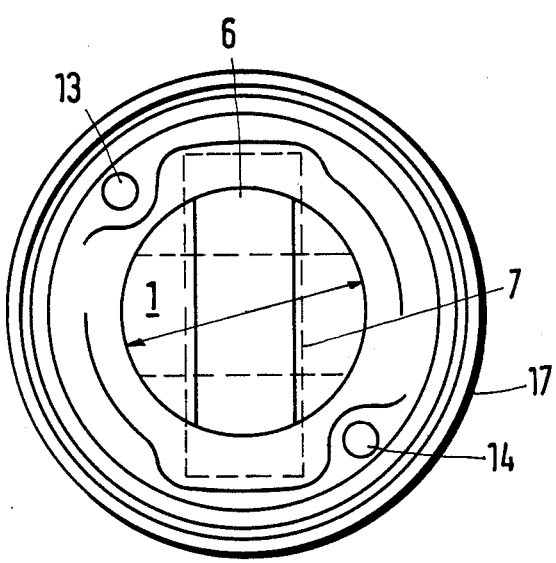
FIG. 4 is a bottom view showing the light alloy piston of FIG. 1.

Referring to FIGS. 1-4, a light alloy piston consists of a top part 3, which includes the piston head 1 and the ring-carrying portion 2 and is provided with a cylindrical plate 5, which is made of a ceramic material and has been inserted into a correspondingly shaped recess 4 in the inside surface of the piston head 1. The diameter of the plate 5 is smaller than the length of the piston pin 6. The plate 5 is formed with a recess 7, which has the shape of a segment of a cylinder having an axis that is parallel to the axis of the piston pin 6. The latter is movably mounted in the recess 7 and in hub segments 8, 9 of the bottom part 10 of the piston. The bottom part 10 comprises a pilot portion 11, which cooperates with a mating pilot portion 12 of the top part 3 so as to center the bottom part 10. Pine 13, 14 inserted in the bottom part 3 protrude into mating bores 15, 16 of the piston head 1 and are welded to the latter. The piston pin 6 is firmly connected to the piston rod, not shown, and is axially located by the inside surface of the ring-carrying portion 2. The distance between the outer ends of the hub segments 8, 9 is slightly smaller than the smallest inside diameter of the top part 3. The piston skirt 17 has a circular lower end portion for guiding the piston in the cylinder. The skirt 17 is provided with setback portions, which are defined by chords. Parts of said setback portions are disposed laterally of the hub segments 8, 9 and extend as far as to the end faces of the latter. Other parts are disposed below the hub segments 8, 9 and extend as far as to the circular end portion. The plate 5 provided in the recess 4 which is formed in the inside surface of the piston head 1 is formed with two grooves 18, 19 which extend transversely to the direction of the piston pin axis and are intended to constitute weak points.

For the purpose of the invention the plate between the piston head and the piston pin may be made of any material which impedes the transmission of heat from the piston head to the piston pin during the operation of the engine, and the statement that said plate is made of heat-insulating material is intended to be interpreted in that broad sense.

It will be appreciated that the instant specification and claims are set forth by way of illustration and not limitation, and that various modifications and changes may be made without departing from the spirit and scope of the present invention.

What is claimed is:

1. In a piston for internal combustion engines having a top part including at least a piston head and a ring-carrying portion, a bottom part and means connecting the bottom part to the top part, the improvement comprising: means for movably mounting a piston pin comprising hub segments in the bottom part of the piston and a plate inserted in a mating recess on the inside of the piston head and consisting of a heat-insulating material and having a recess therein which has the shape of a segment of a cylinder having an axis that is parallel to the piston pin and wherein the means connecting the top part and the bottom part comprises at least two pins integrally formed with or embedded in the cast lower part or are inserted therein and which protrude into mating bores in the top part and are welded to the top part.

2. The piston according to claim 1, wherein the plate consists of one of a ceramic material, a metallic material which is coated with a ceramic layer, and a molding composed of ceramic fibers.

3. The piston according to claim 1, wherein the hub segments have outer ends and the top part has an inner diameter and wherein the distance between the outer ends of the hub segments is smaller than the inside diameter of the top part.

4. The piston according to claim 1, wherein the bottom part includes a skirt of the piston having a circular lower end portion for guiding the pistion in a cylinder and the skirt is formed with setback portions which are defined by chords and extend in part laterally of the hub segments and in part below the hub segments as far as to the circular lower end portion.

5. The piston according to claim 1, wherein the compression height amounts to 20 to 30% of the diameter of the piston, the distance between the hubs amounts to 80 to 65% of the piston diameter and the length of the piston pin amounts to 50 to 70% of the piston diameter.

6. The piston according to claim 1, wherein the plate on the side which faces the piston head is formed with a plurality of narrow grooves which extend transversely to the axis of the piston pin.

7. In a piston for internal combustion engines having a top part including at least a piston head and a ring-carrying portion, a bottom part and means connecting the bottom part to the top part, the improvement comprising: means for movably mounting a piston pin comprising hub segments in the bottom part of the piston and a plate inserted in a mating recess on the inside of the piston head and consisting of a heat-insulating material and having a recess therein which has the shape of a segment of a cylinder having an axis that is parallel to the piston pin wherein the hub segments have outer ends and the top part has an inner diameter and wherein the distance between the outer ends of the hub segments is smaller than the inside diameter of the top part.

8. The piston according to claim 7, wherein the plate consists of one of a ceramic material, a metallic material which is coated with a ceramic layer, and a molding composed of ceramic fibers.

9. The piston according to claim 7, wherein the means connecting the top part and the bottom part comprises at least two screws, which are integrally formed with or embedded in the cast lower part or are inserted therein and which protrude into mating bores in the top part and are screw-connected to the top part.

10. The pistion according to claim 7, wherein the bottom part includes a skirt of the piston having a circular lower end portion for guiding the piston in a cylinder and the skirt is formed with setback portions which are defined by chords and extend in part laterally of the hub segments and in part below the hub segments as far as to the circular lower end portion.

11. The piston according to claim 7, wherein the compression height amounts to 20 to 30% of the diameter of the piston, the distance between the hubs amounts to 80 to 65% of the piston diameter and the length of the piston pin amounts to 50 to 70% of the piston diameter.

12. The piston according to claim 7, wherein the plate on the side which faces the piston head is formed with a plurality of narrow grooves which extend transversely to the axis of the piston pin.

13. In a piston for internal combustion engines having a top part including at least a piston head and a ring-carrying portion, a bottom part and means connecting the bottom part to the top part, the improvement comprising: means for movably mounting a piston pin comprising hub segments in the bottom part of the piston and a plate inserted in a mating recess on the inside of the piston head and consisting of a heat-insulating material and having a recess therein which has the shape of a segment of a cylinder having an axis that is parallel to the piston pin, wherein the bottom part includes a skirt of the piston having a circular lower end portion for guiding the piston in a cylinder and the skirt is formed with setback portions which are defined by chords and extend in part laterally of the hub segments and in part below the hub segments as far as to the circular lower end portion.

14. The piston according to claim 13, wherein the plate consists of one of a ceramic material, a metallic material which is coated with a ceramic layer, and a molding composed of ceramic fibers.

15. The piston according to claim 13, wherein the means connecting the top part and the bottom part comprises at least two screws, which are integrally formed with or embedded in the cast lower part or are inserted therein and which protrude into mating bores in the top part and are screw-connected to the top part.

16. The piston according to claim 13, wherein the compression height amounts to 20 to 30% of the diameter of the piston, the distance between the hubs amounts to 80 to 65% of the piston diameter and the length of the piston pin amounts to 50 to 70% of the piston diameter.

17. The piston according to claim 13, wherein the plate on the side which faces the piston head is formed with a plurality of narrow grooves which extend transversely to the axis of the piston pin.

18. In a piston for internal combustion engines having a top part including at least a piston head and a ring-carrying portion, a bottom part and means connecting the bottom part to the top part, the improvement comprising: means for movably mounting a piston pin comprising hub segments in the bottom part of the piston and a plate inserted in a mating recess on the inside of the piston head and consisting of a heat-insulating material and having a recess therein which has the shape of a segment of a cylinder having an axis that is parallel to the piston pin, wherein compression height amounts to 20 to 30% of the diameter of the piston, the distance between the hubs amounts to 80 to 65% of the piston diameter and the length of the piston pin amounts to 50 to 70% of the piston diameter.

19. The piston according to claim 18, wherein the plate consist of one of a ceramic material, a metallic material which is coated with a ceramic layer, and a molding composed of ceramic fibers.

20. The piston according to claim 18, wherein the means connecting the top part and the bottom part comprises at least two screws, which are integrally formed with or embedded in the cast lower part or are inserted therein and which protude into mating bores in the top part and are screw-connected to the top part.

21. The piston according to claim 18, wherein the plate on the side which faces the piston head is formed with a plurality of narrow grooves which extend transversely to the axis of the piston pin.

22. In a piston for internal combustion engines having a top part including at least a piston head and a ring-carrying portion, a bottom part and means connecting the bottom part to the top part, the improvement comprising: means for movably mounting a piston pin comprising hub segments in the bottom part of the piston and a plate inserted in a mating recess on the inside of the piston head and consisting of a heat-insulating material and having a recess therein which has the shape of a segment of a cylinder having an axis that is parallel to the piston pin, wherein the plate on the side which faces the piston head is formed with a plurality of narrow grooves which extend transversely to the axis of the piston pin.

23. The piston according to claim 22, wherein the plate consists of one of a ceramic material, a metallic material which is coated with a ceramic layer, and a molding composed of ceramic fibers.

24. The piston according to claim 22, wherein the means connecting the top part and the bottom part comprises at least two screws, which are integrally formed with or embedded in the cast lower part or are inserted therein and which protrude into mating bores in the top part and are screw-connected to the top part.

* * * * *

UNITED STATES PATENT AND TRADEMARK OFFICE
CERTIFICATE OF CORRECTION

PATENT NO. : 4,747,340

DATED : May 31, 1988

INVENTOR(S) : Klaus Schellmann, et al

It is certified that error appears in the above-identified patent and that said Letters Patent is hereby corrected as shown below:

Col. 1, line 34      Delete "outor" and substitute --outer--

Col. 1, line 51      After "outer piston" insert --part including the piston head, the ring-carrying portion--

Col. 3, line 29      Delete "arc" and substitute --are--

Col. 6, line 10      Delete "consist" and substitute --consists--

Signed and Sealed this

Third Day of January, 1989

Attest:

DONALD J. QUIGG

*Attesting Officer*      *Commissioner of Patents and Trademarks*